United States Patent Office 3,792,032
Patented Feb. 12, 1974

---

3,792,032
POLYPEPTIDES RELATED TO THE C-TERMINAL HEPTAPEPTIDE OF BOMBESIN AND ALYTESIN
Luigi Bernardi, Roberto de Castiglione, Gian Carlo Fregnan, and Onofrio Goffredo, Milan, Italy, assignors to Societa Farmaceutical Italia, Milan, Italy
No Drawing. Filed Aug. 14, 1970, Ser. No. 63,906
Claims priority, application Italy, July 31, 1970, 28,126/70
Int. Cl. C07c *103/52*
U.S. Cl. 260—112.5          19 Claims

ABSTRACT OF THE DISCLOSURE

Polypeptides of the formula

X—Trp—Ala—Val—Gly—His—Leu—Met—$NH_2$ wherein X is selected from the group consisting of hydrogen, an acyl radical of a carboxylic acid, of an aminoacid, of a dipeptide, its protected derivatives and its salts. The polypeptides display an activity on the systemic pressure and a stimulating activity on the uterus, colon, ileum and gastric secretion and a hyperglycemic action.

---

The present invention relates to a new class of biologically active polypeptides and to a process for their preparation.

More particularly, the present invention relates to new polypeptides the structure of which is characterized by a C-terminal heptapeptide which may be attached to one or two initial aminoacids. The structural formula of the polypeptides of the invention is (the aminoacids are represented by the symbols conventionally employed in polypeptide chemistry and refer to the optical configuration "L"):

X—Trp—Ala—Val—Gly—His—Leu—Met—$NH_2$ wherein X is selected from the group consisting of hydrogen, a radical of a carboxylic acid, of an amino acid, of a dipeptide, its protected derivatives and its salts.

A further object of the invention is a process for the preparation of the polypeptides having the above formula.

There are many possibilities of synthesis of the peptides of the present invention, consisting essentially in the successive condensation of aminoacids of protected polypeptides, so that the resulting polypeptide has the sequence of aminoacids of the above formula, this condensation being carried out according to methods known in polypeptide chemistry.

The aminoacids and polypeptides which, from time to time are condensed, have the amino and carboxyl groups which are not involved in the formation of the peptide linkage blocked by a protecting group that is capable of being removed by acidolysis or hydrogenolysis or other known methods.

The following protecting groups may be employed for the protection of the amino group, for example: tosyl (p-toluensulphonyl), carbobenzoxy (carbobenzyloxy), carbo-t-butoxy, p-nitrocarbobenzoxy, trityl (triphenyl methyl), formyl, trifluoroacetyl and others usually employed in polypeptide chemistry. The following protecting groups may be employed for the protection of the carboxyl group, for example: methyl, ethyl, t-butyl, benzyl, p-nitrophenyl and others usually employed in this field.

The condensation between the amino group of one molecule and the carboxyl group of another molecule to form the peptide linkage, takes place according to the usual methods known in polypeptide chemistry, for example through a suitable activated acyl-derivative such as a mixed anhydride, an azide, a p-nitrophenyl-ester, a 2,4,5-trichlorophenylester, or an N-hydroxy-succinmidyl ester, or by direct condensation between the free amino group and the free carboxyl group, in the presence of a suitable condensing agent such as a carbodiimide selected from the group consisting of dicyclohexylcarbodiimide, 1-cyclohexy - 3 - morpholinyl-carbodiimide and others known in the art.

The condensation may be carried out in a suitable solvent of the group of N,N-dialkylformamides, lower aliphatic nitriles and pyridines, for example dimethylformamide, acetonitrile and pyridine; the reaction starts at from —20° C. to room temperature and it is completed at a temperature of from room temperature to 35° C. for a period of from 12 hours to 10 days.

The products of the present invention display a high polyvalent biological activity. Particularly, it has been found that the products of the invention display a high action on the systemic pressure and a stimulating activity on the uterus, on the colon, on the ileum and on the gastric secretion and, moreover, display a hyperglycemic action. Tests carried out "in vitro" on the uterus of rats in estrus have shown that the following products have a very high contracturant action with a threshold of 30–100π g./ml.:

Boc—Trp—Ala—Val—Gly—His—Leu—Met—$NH_2$,

Gln—Trp—Ala—Val—

Gly—His—Leu—Met—$NH_2$ and

Boc—Gln—Trp—Ala—Val—

Gly—His—Leu—Met—$NH_2$ and display an activity 3–5 times higher than that of bradykinin and 2–3 times higher than oxytocin both as to intensity and duration. The following examples are given to illustrate the invention without limiting it.

EXAMPLE 1

Trp—Ala—Val—Gly—His—Leu—Met—$NH_2$ 15.7 g. of Boc—Val—Gly—OEt (R. de Castiglione, II Farmaco, Ed. Sci. 24, p. 664, 1969) are allowed to react for 40 minutes in 60 ml. of hydrochloric acid/acetic acid 1.33 N. The solvent is then evaporaetd in vacuo, the residue is pulped with anhydrous diethyl ether and the product is dried "in vacuo" over potassium hydroxide and phosphoric anhydride. 11.05 g. of
$^+H_2$—Val—Gly—OEt—Cl$^-$ in the form of solid foam are obtained; $E_{1,2}=1.05$ Leu.

To a solution of 8.76 g. of Boc—Ala (E. Schnabel, Liebigs Ann. Chem. 702, p. 108, 1967) in 80 ml. of anhydrous tetrahydrofuran is added a solution of 11.05 of $^+H_2$—Val—Gly—OEt—Cl$^-$ in 80 ml. of anhydrous tetrahydrofuran. The reaction mixture is cooled to 0° C. and added with 5.14 ml. of N-methylmorpholine followed by 5.32 g. of N-hydroxysuccinimide and then by 9.55 g. of dicyclohexylcarbodiimide.

The reaction mixture is allowed to stand at 0° C. for 2 hours and at room temperature overnight. The tetrahydrofuran is evaporated off and the residue is taken up with boiling ethyl acetate. Dicyclohexylurea is separated by filtration and the organic solution is washed with 1 N hydrochloric acid at 0° C., water, a 5% solution of sodium bicarbonate and then water.

The mixture is dried over sodium sulfate, the solvent is evaporated and by crystallization from ethyl acetate 10 g. of Boc—Ala—Val—Gly—OEt are obtained, melting at 165°–167° C.; $[\alpha]_D^{25}=-23.5°$ (c.=1 dimethylformamide).

8 g. of Boc—Ala—Val—Gly—OEt are allowed to react for 40 minutes in 30 ml. of hydrochloric acid/acetic acid 1.33 N. The solvent is evaporated in vacuo, the residue is pulped with anhydrous diethyl ether and the product is dried "in vacuo" over potassium hydroxide and phosphoric anhydride. $^+H_2$—Ala—Val—Gly—OEt.Cl$^-$ is obtained, melting at 188°–190° C.; $E_{1.2}$=0.83 Leu; $[\alpha]_D^{25}$=+5.5 (c.=1 dimethylformamide).

0.746 g. of Boc—Trp are dissolved in 10 ml. of anhydrous tetrahydrofuran, cooled to —15° C. and 0.274 ml. of N-methylmorpholine are added together with 0.32 ml. of isobutylchloroformate. After 7 minutes at —15° C., a precooled solution of 0.76 g. of

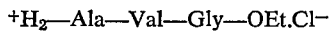
+H$_2$—Ala—Val—Gly—OEt.Cl$^-$ in 5 ml. of anhydrous dimethylformamide containing 0.274 ml. of N-methylmorpholine is added. The temperature is adjusted from —15° C. to room temperature during 3 hours, then the reaction mixture is allowed to stand overnight at room temperature. The reaction mixture is filtered, the solvent is evaporated in vacuo, the residue is dissolved in ethyl acetate containing methanol, the solution is washed with 1 N hydrochloric acid at 0° C., with 5% sodium bicarbonate and then with water. The mixture is dried over sodium sulfate and the solvent is evaporated. By crystallization from methanol-ether, 1.16 g. of Boc—Trp—Ala—Val—Gly—OEt are obtained, melting at 200° C. 1.12 g. of Boc—Trp—Ala—Val—Gly—OEt are suspended in 10 ml. of ethanol and saponified by addition of 5 ml. of sodium hydroxide. After 2 hours at room temperature, the mixture is diluted with water, washed 2 times with ethyl acetate, acidified with 1 N hydrochloric acid at 0° C. and the product is extracted with ethyl acetate containing some methanol. It is washed with water, dried over sodium sulfate, the solvent is evaporated and the residue is crystallized from ethyl acetate. 0.85 g. of Boc—Trp—Ala—Val—Gly are obtained, melting at 150° C.

5.39 g. of Boc—His—NH—NH$_2$ (E. Schröder et al., Liebigs Ann. Chem. 656, p. 190, 1962) are dissolved in 30 ml. of anhydrous dimethylformamide, the solution is cooled to —25° C., then 33.3 ml. of anhydrochloric acid/tetrahydrofuran 2.1 N are dropped therein followed by 2.38 ml. of t-butyl nitrite. After 10 minutes at —30° C., 9.8 ml. of triethylamine are dropped therein. The reaction mixture is then added to a suspension pre-cooled at —30° C. and obtained by dissolving 5.96 g. of

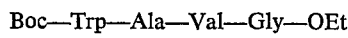
+H$_2$—Leu—Met—NH$_2$.Cl$^-$ (Bernardi et al., Gazz. Chim. Ital., 94, p. 853, 1964) in 25 ml. of anhydrous dimethylformamide, by cooling and adding 2.8 ml. of triethylamine.

The reaction mixture is shaken for 15 minutes at —25° C. and then kept for 2 days at —10° C. 1 ml. of triethylamine is added and the solution is maintained for 5 hours at 0° C. The reaction mixture is then poured into ether and the precipitate formed is dissolved in ethyl acetate, washed with a solution of boric acid 0.5 N and then with a 5% solution of sodium bicarbonate.

After drying over sodium sulfate, concentration to a small volume and precipitation with ether, 7.6 g. of Boc—His—Leu—Met—NH$_2$ are obtained.

By recrystallization from ethyl acetate an analytic sample, melting at 159–161° C., is obtained.

4.02 g. of Boc—His—Leu—Met—NH$_2$ are reacted for 30 minutes at room temperature with 40 ml. of hydrochloric acid/acetic acid 1.33 N. The solvent is evaporated and the residue is taken up with anhydrous diethyl ether. After drying in vacuo 3.95 g. of

+H$_2$—His—Leu—Met—NH$_2$.Cl$^-$ are obtained, which are dissolved in methanol and eluted through a column of Amberlite IR-45(OH)$^-$, 3 g. of the tripeptide as free base are obtained: $E_{1.2}$=1.21 Leu.

0.82 g. of Boc—Trp—Ala—Val—Gly and 0.18 g. of N-hydroxysuccinimide are dissolved in 2 ml. of anhydrous dimethylformamide; after cooling at 0° C., 0.32 g. of dicyclohexylcarbodiimide are added. The reaction mixture is kept for 2 hours at 0° C. and for 1 hour at room temperature. Dicyclohexylurea is separated by filtration in a flask containing 0.614 g. of His—Leu—Met—NH$_2$ and 3 ml. of anhydrous dimethylformamide are used for washing. After 22 hours at room temperature the solution is filtered and then concentrated to small volume. By diluting with ethyl acetate 1.30 g. of Boc—Trp—Ala—Val—Gly—His—Leu—Met—NH$_2$ melting at 219–221° C. are obtained, which by recrystallization from methanol gives a product melting at 231° C.; $E_{1.2}$=0.46 Leu.

0.50 g. of

Boc—Trp—Ala—Val—Gly—His—Leu—Met—NH$_2$ are reacted for 40 minutes at room temperature with 10 ml. of hydrochloric acid/acetic acid 1.33 N to which have been added 2 ml. of 99% formic acid to make dissolution of the product easier. The solution is concentrated in vacuo and diluted with ether. 0.48 g. of

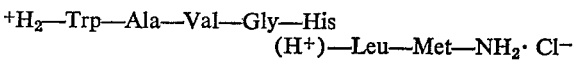
+H$_2$—Trp—Ala—Val—Gly—His(H$^+$)—Leu—Met—NH$_2$.2Cl$^-$ melting at 195–205° C. (decomposition) are obtained; $E_{1.2}$=0.83 Leu. The product so obtained, is dissolved in methanol and eluted through a column of Amberlite IR-45 (OH$^-$) to give the corresponding free base Trp—Ala—Val—Gly—His—Leu—Met—NH$_2$

EXAMPLE 2

Gln—Trp—Ala—Val—Gly—His—Leu—Met—NH$_2$ 246 mg. of Boc—Gln and 115 mg. of N-hydroxysuccinimide are dissolved in 2 ml. of anhydrous dimethylformamide, cooled to 0° C. and 206 mg. of dicyclohexylcarbodiimide are added. The mixture is allowed to stand for 2 hours at 0° C. and for 2 hours at room temperature. The mixture is filtered directly in a flask containing 895 mg. of

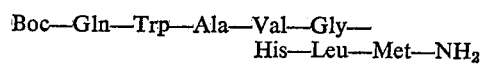
+H$_2$—Trp—Ala—Val—Gly—His(H$^+$)—Leu—Met—NH$_2$· Cl$^-$ and employing 2 ml. of dimethylformamide for the washings, 0.48 ml. of tri-n-butylamine are added and the mixture is allowed to stand overnight at room temperature. The mixture is filtered, concentrated to a small volume and diluted with diethyl ether. The precipitate is recrystallized from methanol. 700 mg. of Boc—Gln—Trp—Ala—Val—Gly—His—Leu—Met—NH$_2$ are obtained, melting at 218—219° C.; $E_{1.2}$=0.38 Leu.

0.57 g. of

Boc—Gln—Trp—Ala—Val—Gly—His—Leu—Met—NH$_2$ were reacted for 40 minutes at room temperature with 10 ml. of hydrochloric acid/acetic acid 1.33 N. which was added with 2 ml. of 99% formic acid to facilitate solubilization. The solution is concentrated and diluted with ether. 0.47 g. of

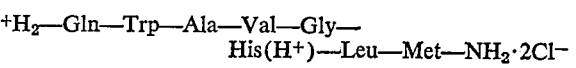
+H$_2$—Gln—Trp—Ala—Val—Gly—His(H$^+$)—Leu—Met—NH$_2$·2Cl$^-$ are obtained, melting at 185–190° C. (decomposition); $E_{1.2}$=0.76 Leu. The product, thus obtained, is dissolved in methanol and by elution through a column of Amberlite IR-45(OH$^-$) the corresponding free base Gln—Trp—Ala—Val—Gly—His—Leu—Met—NH$_2$ is obtained.

EXAMPLE 3

Val—Trp—Ala—Val—Gly—His—Leu—Met—NH$_2$

Operating in the same manner as described in Example 2, by condensation of Boc—Val with +H₂—Trp—Ala—Val—Gly—
　　　　　　His(H+)—Leu—Met—NH₂·2Cl⁻

Boc—Val—Trp—Ala—Val—Gly—
　　　　　　His—Leu—Met—NH₂ is obtained; $E_{1.2}=0.38$ Leu, which gives the corresponding free octapeptide

Val—Trp—Ala—Val—Gly—His—Leu—Met—NH₂;

$E_{1.2}=0.76$ Leu.

EXAMPLE 4

Phe—Trp—Ala—Val—Gly—His—Leu—Met—NH₂

Operating in the same manner as described in Example 2, by condensation of Bos—Phe with +H₂—Trp—Ala—Val—Gly—
　　　　　　His(H+)—Leu—Met—NH₂·2Cl⁻, Boc—Phe—Trp—Ala—Val—Gly—
　　　　　　His—Leu—Met—NH₂, is obtained; $E_{1.2}=0.38$ Leu which gives the corresponding free octapeptide Phe—Trp—Ala—Val—Gly—His—Leu—Met—NH₂, $E_{1.2}=0.76$ Leu.

EXAMPLE 5

Asn—Trp—Ala—Val—Gly—His—Leu—Met—NH₂

Operating in the same manner as in Example 2, by condensation of Boc—Asn with

+H₂—Trp—Ala—Val—Gly—
　　　　　　His(H+)—Leu—Met—NH₂·2Cl⁻

Boc—Asn—Trp—Ala—Val—Gly—
　　　　　　His—Leu—Met—NH₂ is obtained; $E_{1.2}=0.38$ Leu which gives the corresponding fee octapeptide

Asn—Trp—Ala—Val—Gly—His—Leu—Met—NH₂;

$E_{1.2}=0.76$ Leu.

EXAMPLE 6

Asn—Gln—Trp—Ala—Val—Gly—
　　　　　　His—Leu—Met—NH₂

To a solution of 200 mg. of Bos—Asn—ONp and 515 mg. of

+H₂—Gln—Trp—Ala—Val—Gly—
　　　　　　His(+H)—Leu—Met—NH₂·2Cl⁻ in 4 ml. of anhydrous dimethylformamide, 0.24 ml. of tributylamine are added. After 4 days at room temperature, the solution is poured into diethyl acetate and the precipitate is recrystallized from methanol-ether. 270 mg. of Boc—Asn—Gln—Trp—Ala—Val—
　　　　　　Gly—His—Met—NH₂ are obtained, melting at 220–221° C.; $E_{1.2}=0.39$ Leu. Operating as described in Example 1, 100 mg. of this product give 95 mg. of +H₂—Asn—Gln—Trp—Ala—Val—Gly—
　　　　　　His(+H)—Leu—Met—NH₂·2Cl⁻ melting at 190° C. (decomposition), $E_{1.2}=0.63$ Leu.

The product, thus obtained, dissolved in methanol and eluted through a column of Amberlite IR–45(OH⁻), gives the corresponding free polypeptide Asn—Gln—Trp—Ala—Val—
　　　　　　Gly—His—Leu—Met—NH₂.

We claim:
1. A polypeptide of the formula:
X—L. Trp—L. Ala—L. Val—Gly—L. His—L. Leu—L. Met·NH₂ wherein X is selected from the group consisting of hydrogen, L. Gln-, L. Val-, L. Phe-, L. Asn-, L. Asn-, L. Gln-, and carboterbutoxy protected derivatives and salts of said polypeptide.
2. L. Trp—L. Ala—L. Val—Gly—L. His—L. Leu—L. Met—NH₂.
3. Boc—L. Trp—L. Ala—L. Val—Gly—L. His—L. Leu—L. Met—NH₂.
4. +H₂—L. Trp—L. Ala—L. Val—Gly—L. His(H+)—L. Leu—L. Met—NH₂·2Cl⁻.
5. L. Gln—L. Trp—L. Ala—L. Val—Gly—L. His—L. Leu—L. Met—NH₂.
6. Boc—L. Gln—L. Trp—L. Ala—L. Val—Gly—L. His—L. Leu—L. Met—NH₂.
7. +H₂—L. Gln—L. Trp—L. Ala—L. Val—Gly—L. His(H+)—L. Leu—L. Met—NH₂·2Cl⁻.
8. L. Val—L. Trp—L. Ala—L. Val—Gly—L. His—L. Leu—L. Met—NH₂.
9. Boc—L. Val—L. Trp—L. Ala—L. Val—Gly—L. His—L. Leu—L. Met—NH₂.
10. +H₂—L. Val—L. Trp—L. Ala—L. Val—Gly—L. His(H+)—L. Leu—L. Met—NH₂·2Cl⁻.
11. L. Phe—L. Trp—L. Ala—L. Val—Gly—L. His—L. Leu—L. Met—NH₂.
12. Boc—L. Phe—L. Trp—L. Ala—L. Val—Gly—L. His—L. Leu—L. Met—NH₂.
13. +H₂—L. Phe—L. Trp—L. Ala—L. Val—Gly—L. His(H+)—L. Leu—L. Met—NH₂·2Cl⁻.
14. L. Asn—L. Trp—L. Ala—L. Val—Gly—L. His—L. Leu—L. Met—NH₂.
15. Boc—L. Asn—L. Trp—L. Ala—L. Val—Gly—L. His—L. Leu—L. Met—NH₂.
16. +H₂—L. Asn—L. Trp—L. Ala—L. Val—Gly—L. His(H+)—L. Leu—L. Met—NH₂·2Cl⁻.
17. L. Asn—L. Gln—L. Trp—L. Ala—L. Val—Gly—L. His—L. Leu—L. Met—NH₂.
18. Boc—L. Asn—L. Gln—L. Trp—L. Ala—L. Val—Gly—L. His—L. Leu—L. Met—NH₂.
19. +H₂—L. Asn—L. Gln—L. Trp—L. Ala—L. Val—Gly—L. His(H+)—Li Leu—L. Met—NH₂·2Cl⁻.

References Cited

UNITED STATES PATENTS 3,272,790　9/1966　Bernardi et al. ____ 260—112.5
3,374,218　3/1968　Bernardi et al. ____ 260—112.5
3,415,803　12/1968　Lubke et al. _____ 260—112.5

OTHER REFERENCES

Anastasi et al., Experientia 27, 166–167 (1971).
Bernardi et al., Experientia 22, 29–31 (1966).

ELBERT L. ROBERTS, Primary Examiner

U.S. Cl. X.R.

424—177

UNITED STATES PATENT OFFICE
CERTIFICATE OF CORRECTION

Patent No. 3,792,032              Dated February 12, 1974

Inventor(s) Luigi Bernardi et al

It is certified that error appears in the above-identified patent and that said Letters Patent are hereby corrected as shown below:

Column 1, line 6: "Farmaceutical" should read -- Farmaceutici --. Column 1, line 9: "28,126/70" should read -- 28,126 A/70 --. Column 1, line 43; "possibilities of" should read -- possibilities for the --. Column 1, line 45: "aminoacids of" should read -- aminoacids or --. Column 2, line 4: "1-cyclohexy -" should read -- 1-cyclohexyl- --. Column 2, line 18: "a" should read -- an --. Column 2, line 48: "108" should read -- 188 --. Column 3, line 38: "anhydrochloric" should read -- hydrochloric --. Column 4, line 41: "($H^+$)-Leu-Met-$NH_2$·Cl-" should read -- ($H^+$)-Leu-Met-$NH_2$·2Cl- --. Column 5, line 4: "His($H^+$)-Leu-Met-$NH_2$·2Cl-" should read -- His($H^+$)-Leu-Met-$NH_2$·2Cl-, --. Column 5, line 17: "Bos-Phe" should read -- Boc Phe --. Column 5, line 48: "Bos-Asn-ONp" should read -- Boc-Asn-ONp --. Column 6, claim 19, line 2: "-Li Leu- " should read -- -L. Leu- --.

Signed and sealed this 16th day of July 1974.

(SEAL)
Attest:

McCOY M. GIBSON, JR.
Attesting Officer

C. MARSHALL DANN
Commissioner of Patents